United States Patent
Middel

(10) Patent No.: US 12,157,049 B2
(45) Date of Patent: Dec. 3, 2024

(54) ACCESSORY MOUNTING SYSTEM FOR ONE-WHEEL ELECTRIC SKATEBOARDS AND OTHER ONE AND TWO WHEELED VEHICLES

(71) Applicant: SPANGLOR DESIGN COMPANY, LLC., Littleton, CO (US)

(72) Inventor: Joshua A Middel, Littleton, CO (US)

(73) Assignee: SPANGLOR DESIGN COMPANY, LLC., Littleton, CO (US)

( * ) Notice: Subject to any disclaimer, the term of this patent is extended or adjusted under 35 U.S.C. 154(b) by 0 days.

(21) Appl. No.: 18/268,045

(22) PCT Filed: Jul. 6, 2022

(86) PCT No.: PCT/US2022/036233
§ 371 (c)(1),
(2) Date: Jun. 16, 2023

(87) PCT Pub. No.: WO2024/010578
PCT Pub. Date: Jan. 11, 2024

(65) Prior Publication Data
US 2024/0307756 A1    Sep. 19, 2024

(51) Int. Cl.
*A63C 17/00*   (2006.01)
*B62J 11/00*   (2020.01)
*F16M 13/02*   (2006.01)

(52) U.S. Cl.
CPC .......... *A63C 17/0006* (2013.01); *B62J 11/00* (2013.01); *F16M 13/02* (2013.01)

(58) Field of Classification Search
CPC ...... A63C 17/006; A63C 17/00; F16M 13/02; B62J 11/00

USPC .............. 248/229.16, 229.17, 224.8, 225.11, 248/225.21; 224/148.4, 148.7, 148.1
See application file for complete search history.

(56) References Cited

U.S. PATENT DOCUMENTS

| | | | | | |
|---|---|---|---|---|---|
| 5,464,183 | A | * | 11/1995 | McConnell | B62B 9/26 224/407 |
| 6,062,053 | A | * | 5/2000 | Ho | B62J 9/21 224/434 |
| 8,887,975 | B1 | * | 11/2014 | Basile | B62J 11/00 224/452 |
| 2003/0106974 | A1 | * | 6/2003 | Guertin | B62J 9/27 248/230.5 |
| 2006/0208023 | A1 | * | 9/2006 | Manning | B62J 11/00 224/452 |
| 2008/0251555 | A1 | * | 10/2008 | Andrews | B62J 11/04 224/427 |

(Continued)

*Primary Examiner* — Anita M King
(74) *Attorney, Agent, or Firm* — Stanzione & Associates, PLLC; Patrick Stanzione

(57) ABSTRACT

An accessory mounting system to mount accessories onto recreational vehicles. The accessory mounting system can include an accessory mounting frame with an elongated seat, left and right attachment wings extending perpendicularly away from a first side of the seat and an accessory post extending in parallel between the left and right attachment wings to receive an accessory rack thereon. The accessory mounting system can also include an accessory rack with a sleeve to receive the accessory post therethrough and a flexible accessory clip to clip onto the accessory post when the accessory post is inserted through the sleeve, the accessory rack can also include at least two fastening devices to fasten an accessory bag thereto.

23 Claims, 7 Drawing Sheets

(56) References Cited

U.S. PATENT DOCUMENTS

2010/0170925 A1*  7/2010  Osten .................. B62J 7/06
                                                248/309.1
2012/0187169 A1*  7/2012  Osten .................. B62J 11/00
                                                224/420

* cited by examiner

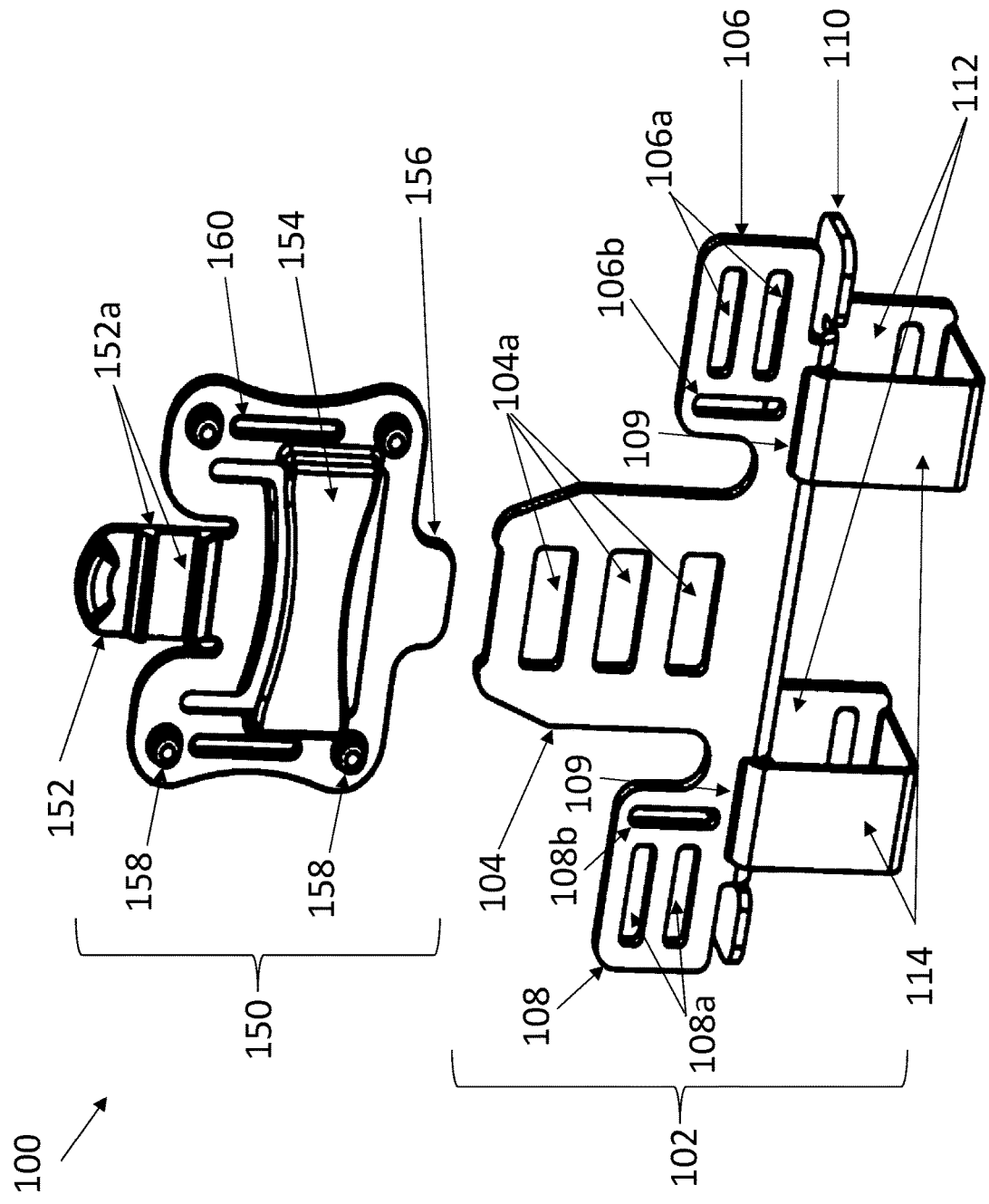

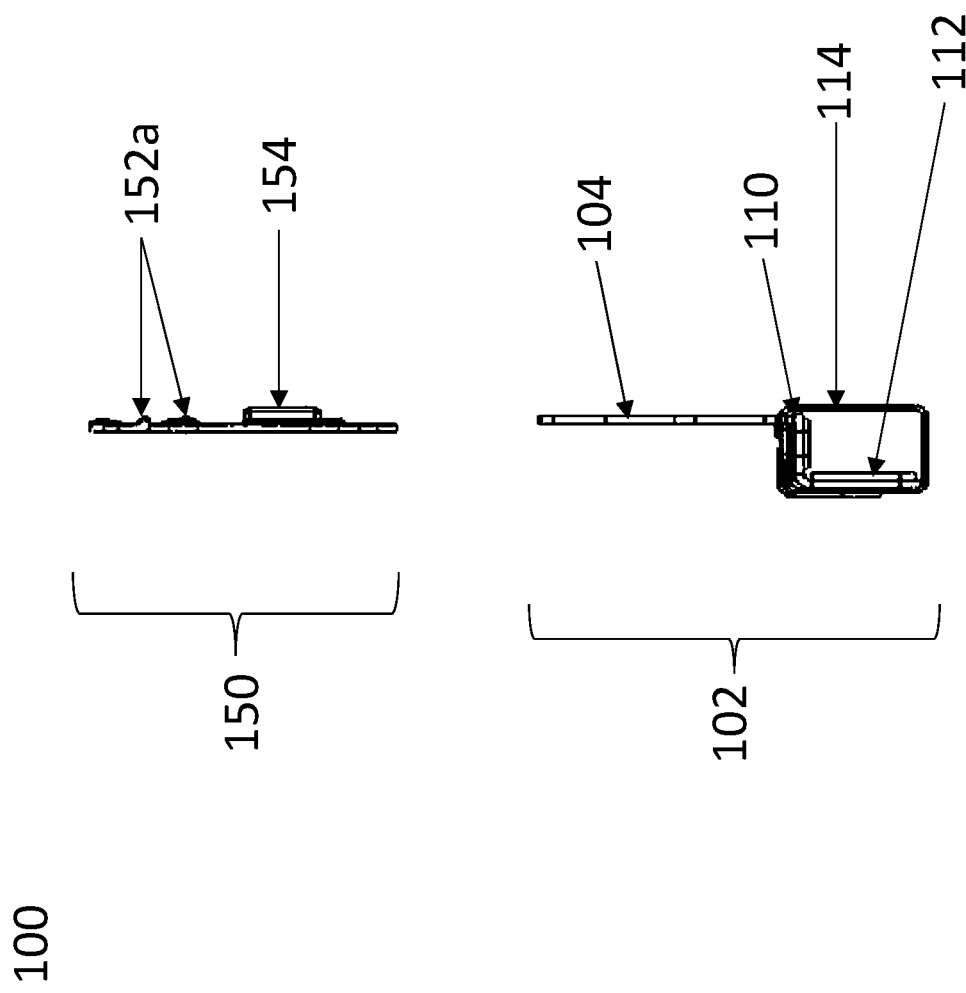

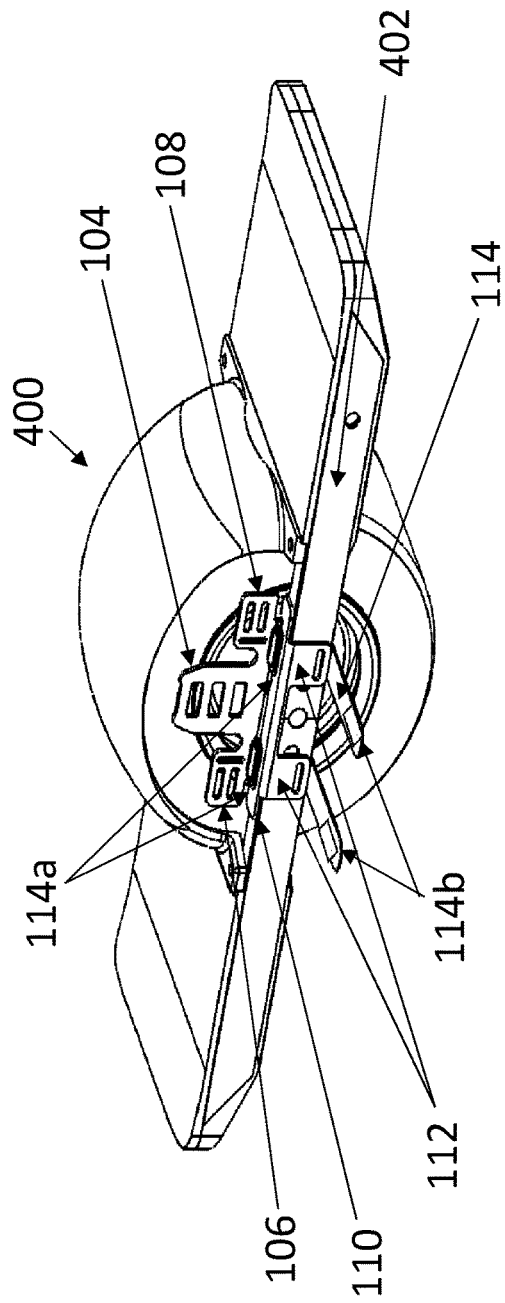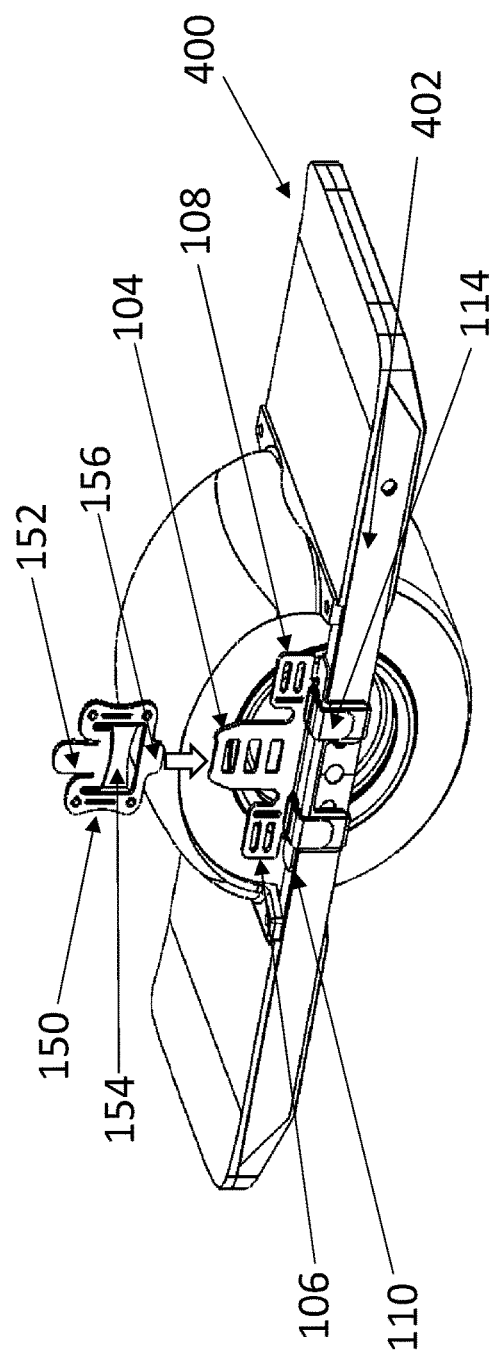

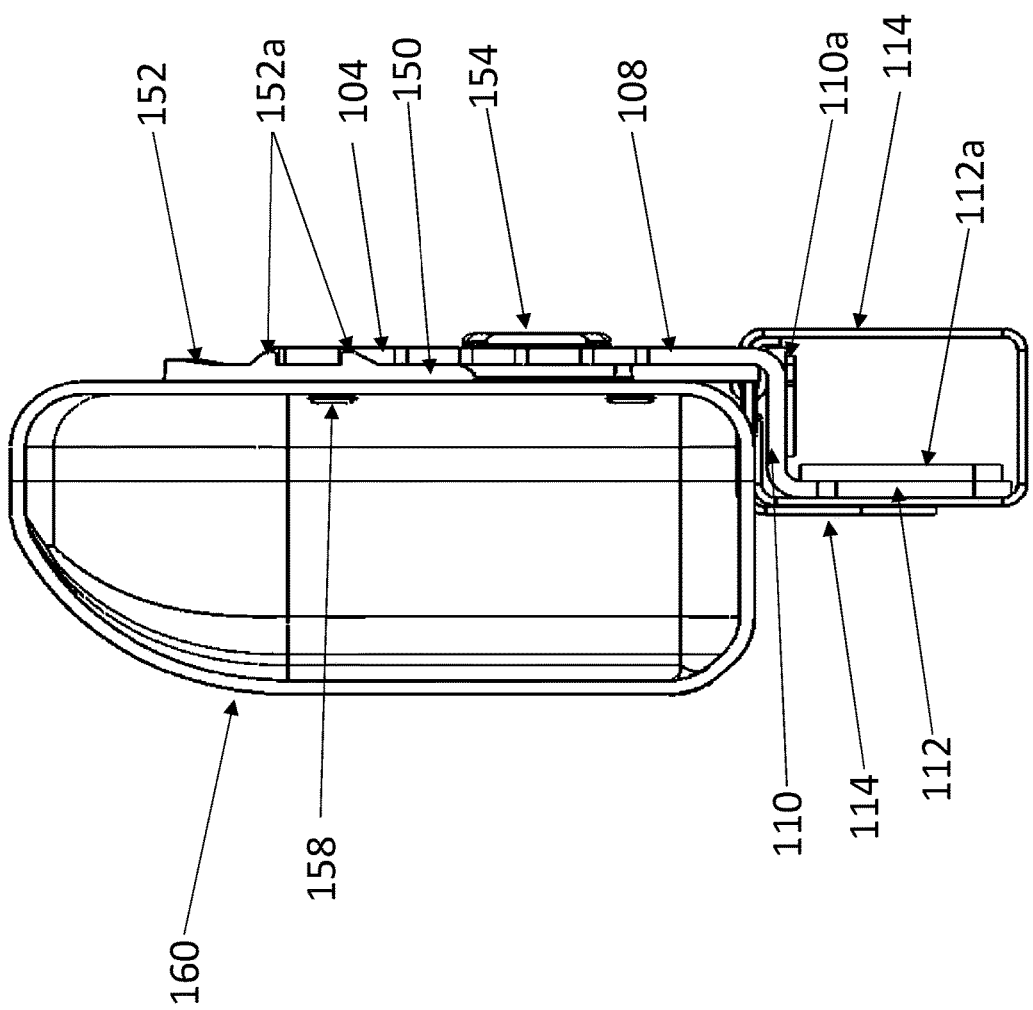

ACCESSORY MOUNTING SYSTEM FOR ONE-WHEEL ELECTRIC SKATEBOARDS AND OTHER ONE AND TWO WHEELED VEHICLES

STATEMENT REGARDING FEDERALLY SPONSORED RESEARCH OR DEVELOPMENT

Not applicable.

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

Field of the Invention

The present inventive concept relates to an accessory mounting system for one-wheeled electric skateboards and other one and two wheeled recreational/transportation vehicles. More particularly, but not exclusively, this inventive concept relates to an accessory mounting system which enables mounting of accessory bags and water bottles on a frame of one-wheeled electric skateboards and other one and two wheeled recreational/transportation vehicles.

Description of the Related Art

Bicycles have been well known means of recreation and transportation for centuries. More recently one-wheeled electric skateboards have been becoming popular as a means of recreation and transportation. Since both bicycles and one-wheeled electric skateboards can be used to travel long distances, users of these devices often require means to carry water bottles and accessories, such as, for example, a vehicle charger, repair tools, a safety kit, sunglasses, drinking water, snacks, phones, and car keys. Backpacks have been a common source available to carry such items. However, wearing a backpack filled with items while riding one-wheel electric skateboards and other one and two wheeled recreational/transportation vehicles can become uncomfortable, can add instability due to the weight distribution within the backpack, and can be overly large in size for items needed for shorter distance rides. Further, wearing such backpacks can detract from the feeling of freedom of riding without large bulky items hanging from the rider.

Water bottle racks, configured to be bolted/threaded to a frame of a bicycle in an upright position to carry a water bottle securely, have been known and used for decades. However, such water bottle racks are not designed to securely hold other desired or necessary items during travel on a bicycle. Further, such water bottle racks cannot be easily attached to a one-wheeled electric skateboard, at least without having to first drill holes into a frame of a one-wheeled electric skateboard and then bolt the water bottle rack thereto. Further, even if such water bottle racks were permanently attached to a frame of a one-wheeled electric skateboard, a water bottle placed therein would be limited to being disposed in alignment of a frame thereof, which is in a horizontal position, such that bumping and jarring caused by riding such vehicles on a road, trail, path, etc., can result in loss of water from the water bottle, or even worse, loss of the water bottle due to the water bottle sliding out of the horizontally positioned rack.

With respect to one-wheeled electric skateboards, there exists aftermarket accessory bags which are attachable to a fender (provided to cover the tire) thereof to allow for the rider to place accessories in a bag location different from having to wear a common backpack or other bag on their person while riding. However, such aftermarket accessory bags require the presence of a tire fender, which most riders, and especially advanced riders, prefer not to have on the skateboard in order to avoid the extra bulk, lack of a sporty appearance and versatility. Further, such aftermarket bags are larger than required for shorter rides, which generally only require a small number of items such as car keys, sunglasses and small amounts of water.

Accordingly, there exists a need for an accessory mounting system to relieve a rider of one-wheeled electric skateboards and other one and two wheeled recreational/transportation vehicles from having to personally wear accessory bags, backpacks, etc.

There is also a need for an accessory mounting system for a one-wheeled skateboard which does not require being attached to a fender installed thereon.

There is also a need for mounting system for a one-wheeled skateboard and other one and two wheeled recreational/transportation vehicles that allows for a variety of different accessory bags to be attached thereto, that can be easily swappable, and that can be quickly mountable as dictated by each rider's planned ride duration or transport trip.

SUMMARY OF THE INVENTIVE CONCEPT

The present general inventive concept provides an accessory mounting system for one-wheel electric skateboards and other one and two wheeled recreational/transportation vehicles. More particularly, but not exclusively, this inventive concept provides an accessory mounting system which enables mounting of accessory bags and water bottles on a frame of one-wheeled electric skateboards and other one and two wheeled recreational/transportation vehicles.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a removable accessory mounting system to mount accessories onto recreational vehicles, comprising: an accessory mounting frame including: an elongated seat; left and right attachment wings extending perpendicularly away from a first side of the elongated seat; an accessory post extending perpendicularly away from the first side of the elongated seat and disposed between the left and right attachment wings, the accessory post including at least two rib ports formed therein to securely receive corresponding ribs of an accessory rack therein; at least one leg extending perpendicularly away from a second side of the elongated seat in a direction opposite to the left and right attachment wings; and a securement strap corresponding to each of the at least one leg to secure the elongated seat and at least one leg to a rail, bar or handle of a recreational vehicle.

In an exemplary embodiment, the left and right attachment wings each comprise at least two horizontal strap ports formed therein to receive accessory straps therethrough.

In another exemplary embodiment, the removable accessory mounting system according to claim 2, may further comprise: an accessory strap secured to each of the at least two horizontal strap ports of the left and right attachment wings, the accessory strap including a D-ring fastened to a first end thereof and a hook-and-loop system attached to a second end thereof, the accessory strap being configured to wrap around an elongated accessory, feed the second end through the D-ring and attach the hook-and-loop system together to secure an elongated accessory to the accessory mounting frame.

In another exemplary embodiment, the at least one leg comprises two legs, a first leg being disposed below the left attachment wing and a second leg being disposed below the right attachment wing.

In still another exemplary embodiment, the accessory mounting frame can be formed of a metal, a hard plastic material or fiberglass material.

In still another exemplary embodiment, the left and right attachment wings can each further comprise at least one vertical strap port formed vertically therein to receive a corresponding accessory strap therethrough.

In yet another exemplary embodiment, the removable accessory mounting system can further comprise: an accessory rack including: a sleeve to receive the accessory post therethrough; a flexible accessory clip having at least two accessory ribs formed thereon to engage with corresponding ones of the rib ports of the accessory post when the accessory post is inserted through the sleeve; and at least two fastening devices to fasten an accessory bag to the accessory rack.

In yet another exemplary embodiment, the accessory rack can further comprise a first vertical accessory port disposed on a left side thereof and a second vertical accessory port disposed on a right side thereof, the first and second accessory ports being configured to receive an accessory strap therethrough to secure an accessory to the accessory rack.

In yet another exemplary embodiment, the elongated seat and at least one leg can be curved inward to form a single arc to rest securely on a circular frame or bar.

The foregoing and/or other features and utilities of the present general inventive concept may also be achieved by providing a removable accessory mounting system to mount accessories onto recreational vehicles, comprising: an accessory mounting frame including: an elongated seat having left and right attachment wings extending perpendicularly away from a first side thereof and an accessory post extending in parallel between the left and right attachment wings and including at least two rib ports formed therein to securely receive corresponding ribs of an accessory rack therein, and at least one leg extending perpendicularly away from a second side of the elongated seat in a direction opposite to the left and right attachment wings; and a securement strap corresponding to each of the at least one leg to secure the elongated seat and at least one leg to a rail, bar or handle of a recreational vehicle; and an accessory rack including: a sleeve to receive the accessory post therethrough, a flexible accessory clip having at least two accessory ribs formed thereon to engage with corresponding ones of the rib ports of the accessory post when the accessory post is inserted through the sleeve, and at least two fastening devices to fasten an accessory bag to the accessory rack.

In an exemplary embodiment, the left and right attachment wings can each comprise at least two horizontal strap ports formed therein to receive accessory straps therethrough.

In another exemplary embodiment, the removable accessory mounting system can further comprise: an accessory strap secured to each of the at least two horizontal strap ports of the left and right attachment wings, the accessory strap including a D-ring fastened to a first end thereof and a hook-and-loop system attached to a second end thereof, the accessory strap being configured to wrap around an elongated accessory, feed the second end through the D-ring and attach the hook-and-loop system together to secure an elongated accessory to the accessory mounting frame.

In another exemplary embodiment, the left and right attachment wings each further comprise at least one vertical strap port formed vertically therein to receive a corresponding accessory strap therethrough.

In yet another exemplary embodiment, the accessory rack can further comprise a first vertical accessory port disposed on a left side thereof and a second vertical accessory port disposed on a right side thereof, the first and second accessory ports being configured to receive an accessory strap therethrough to secure an accessory to the accessory rack.

The foregoing and/or other features and utilities of the present general inventive concept may also be achieved by providing a removable accessory mounting system to mount accessories onto recreational vehicles, comprising: an accessory mounting frame including: an elongated seat; an accessory post extending perpendicularly away from a first side of the elongated seat, the accessory post including at least two rib ports formed therein to securely receive corresponding ribs of an accessory rack therein; at least one leg extending perpendicularly away from a second side of the elongated seat in a direction opposite to the accessory post; and a securement strap corresponding to each of the at least one leg to secure the elongated seat and at least one leg to a rail, bar or handle of a recreational vehicle.

In an exemplary embodiment, the removable accessory mounting system may further comprise: a vertically disposed accessory strap port at both sides of the accessory post; and an accessory strap fed through the vertical accessory strap ports to secure accessories against the accessory post and elongated seat.

In another exemplary embodiment, the removable accessory mounting system may further comprise: an accessory rack including: a sleeve to receive the accessory post therethrough, a flexible accessory clip having at least two accessory ribs formed thereon to engage with corresponding ones of the rib ports of the accessory post when the accessory post is inserted through the sleeve, and at least two fastening devices to fasten an accessory bag to the accessory rack.

BRIEF DESCRIPTION OF THE DRAWINGS

These and/or other features and utilities of the present inventive concept will become apparent and more readily appreciated from the following description of the embodiments, taken in conjunction with the accompanying drawings of which:

FIG. 2 illustrates a back prospective view of the accessory mounting system for one-wheel electric skateboards and other one and two wheeled recreational/transportation vehicles, in accordance with the example embodiment of FIG. 1.

FIG. 3 illustrates a side view of the accessory mounting system for one-wheel electric skateboards and other one and two wheeled recreational/transportation vehicles, in accordance with the example embodiment of FIG. 1.

FIG. 4A illustrates a front prospective view of a main frame portion of the accessory mounting system in accordance with the example embodiment of FIG. 1, while being attached to a one-wheel electric skateboard.

FIG. 4B illustrates a front prospective view of the accessory mounting system in accordance with the example embodiment of FIG. 1, while being attached to a one-wheel electric skateboard.

FIG. 6 illustrates a side sectional view of the accessory mounting system in accordance with the example embodiment of FIG. 5.

Figure 1:
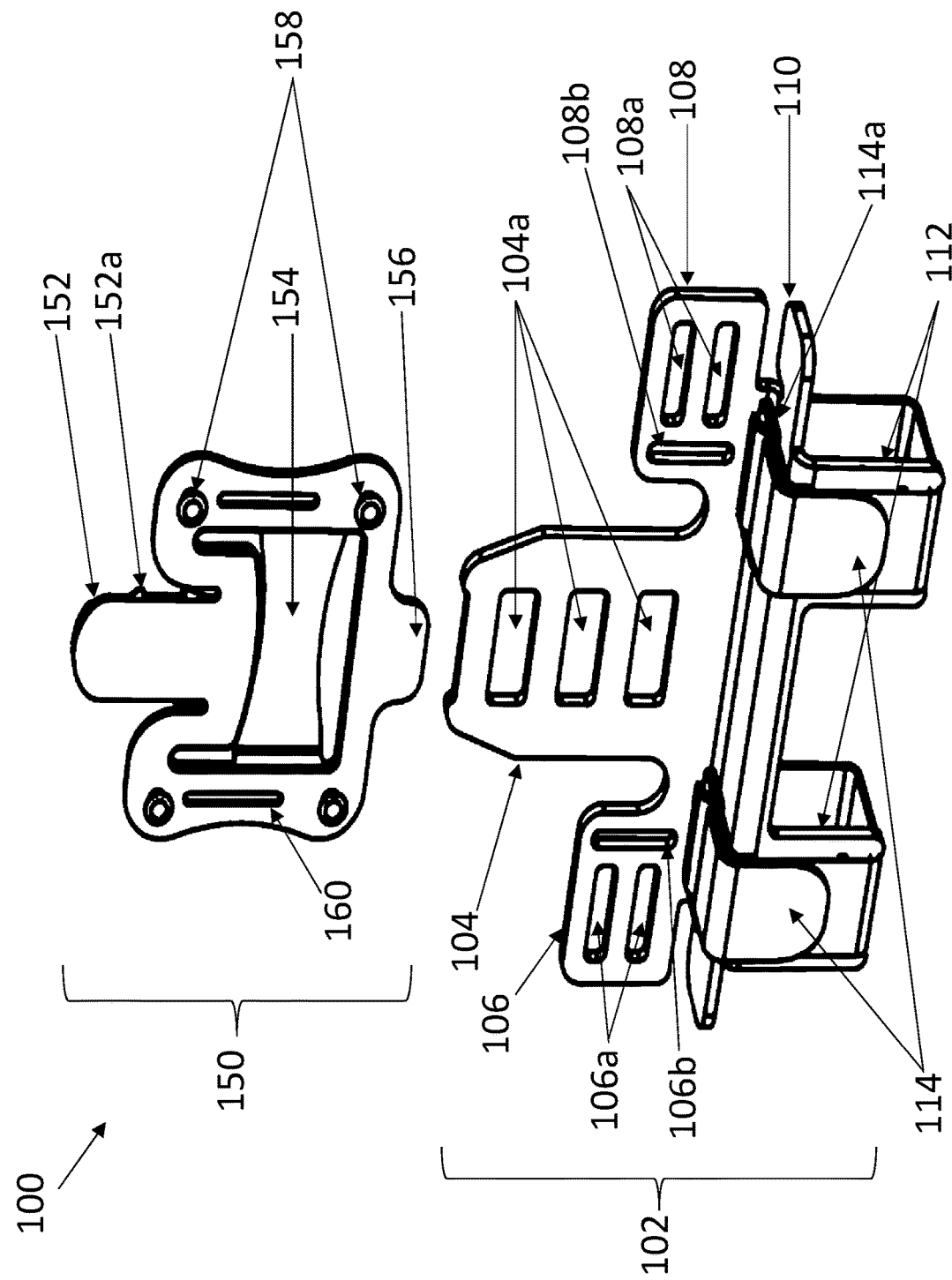
FIG. 1 illustrates a front perspective view of an accessory mounting system for one-wheel electric skateboards and other one and two wheeled recreational/transportation vehicles, in accordance with an example embodiment.

The drawings illustrate a few example embodiments of the present inventive concept, and therefore are not to be considered limiting in its scope, as the overall inventive concept may admit to other equally effective embodiments. The elements and features shown in the drawings are to scale and attempt to clearly illustrate the principles of example embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements.

Hereinafter, one or more exemplary embodiments of the present general inventive concept will be described in detail with reference to accompanying drawings.

Exemplary embodiments of the present general inventive concept are directed to an accessory mounting system for one-wheel electric skateboards and other one and two wheeled recreational/transportation vehicles, and more particularly, but not exclusively, to an accessory mounting system which enables mounting of accessory bags and water bottles on a frame of one-wheeled electric skateboards and other one and two wheeled recreational/transportation vehicles. Example embodiments of the present general inventive concept are also directed to an accessory mounting system configurable for attachment to frames of roll bars and other similar frames of all-terrain vehicles (ATVs).

FIG. 1 illustrates a front perspective view of an accessory mounting system for one-wheel electric skateboards and other one and two wheeled recreational/transportation vehicles, in accordance with an example embodiment. The accessory mounting system 100 according to the example embodiment of FIG. 1 comprises an accessory mounting frame 102. This accessory mounting frame 102 is configured to include an upright portion having a centrally positioned accessory post 104, a left attachment wing 106 disposed to the left of the accessory post 104 and a right attachment wing 108 disposed to the right of the accessory post 104. The accessory mounting frame 102 also comprises a seat 110 configured to rest horizontally along a rail 402 (see FIGS. 4A-4B) of a one wheeled electric skateboard 400. The accessory post 104, left and right attachment wings 106, 108 extend upward from a first side of the seat 110 at an angle perpendicular to the seat 110. Extending downward (opposite direction from the accessory post 104, left and right attachment wings 106, 108) a second side of the seat 110 at an angle perpendicular to the seat 110 is at least one leg 112, and preferably two legs 112. The at least one leg 112 can be configured to rest along a side of the rail 402 of a one wheeled electric skateboard 400. It is to be noted that the seat 110 and the at least one leg 112 can alternatively be shaped to securely rest against a rounded bar of a bicycle or scooter, or other shaped rail or frame of any type of vehicle, such as, for example, the handlebars of a bicycle, scooter or motorcycle, or a roll bar of a Jeep or ATV.

The accessory mounting frame 102 preferably consists of a singular structure, and can be formed of a metal, fiberglass, or hard plastic material. However, the accessory mounting frame 102 can alternatively be formed of another type of material which will provide the intended purposes of being sufficiently rigid to withstand impacts during travel while being disposed close to a road, yet flexible enough to flex back when impacted by objects along a road, trail or path in which recreational vehicle travels.

The right attachment wing 106 and left attachment wing 108 of the accessory mounting frame 102 can each include at least two horizontal strap ports 106a and 108a, respectively, to receive therethrough a strap to retain hold of a water bottle or other accessory item. The right and left attachment wings 106, 108 can also include a respective vertical strap port 106b, 108b to receive therethrough a strap to retain an accessory in an upright position.

Referring to FIGS. 1 and 2, a securement strap 114 can be provided to secure the accessory mounting frame 102 to a one-wheeled electric skateboard or to other one and two wheeled recreational/transportation vehicles. The securement straps 114 can include a D-ring 114a disposed at a first end thereof and a hook-and-loop system 114b (see FIG. 4A; i.e., Velcro®) disposed at a second opposite end thereof.

As illustrated in FIG. 2, securement strap ports 109 can be disposed horizontally through the left and right attachment wings 106, 108 below the respective vertical strap ports 106b, 108b. The securement straps 109 are configured to receive respective securement straps 114 therethrough to enable the second end of the securement straps 114 to wrap around a frame of a one-wheeled electronic skateboard (or bar/frame of a vehicle), around the leg 112, through the D-ring 114a and secure to itself using the hook-and-loop system 114b. In this example embodiment, the accessory mounting frame 102 includes two securement straps 114. The first securement strap 114 being disposed to extend through the respective securement strap port 109, wrap around a frame of a one-wheeled electronic skateboard (or bar/frame of a vehicle), wrap around a first leg 112 aligned in parallel with the left attachment wing 106, around the portion of the seat 110 in which the first leg 112 extends therefrom, through the respective D-ring 114a and attach to itself via the hook-and-loop system 114b. The second securement strap 114 being disposed to extend through the respective securement strap port 109, wrap around a frame of a one-wheeled electronic skateboard (or bar/frame of a vehicle), wrap around a second leg 112 aligned in parallel with the right attachment wing 108, and around the portion of the seat 110 in which the second leg 112 extends therefrom, through the respective D-ring 114a and attach to itself via the respective hook-and-look system 114b.

The accessory mounting system 100 according to the example embodiment of FIG. 1 can also include an accessory rack 150. The accessory rack 150 can be configured to slide over and become securely engaged with the accessory post 104. More specifically, the accessory rack 150 can include an accessory flex clip 152 having one or more accessory ribs 152a disposed thereon to engage with the rib ports 104a formed in the accessory post 104. The accessory flex clip 152 is preferably formed of a flexible material such that the accessory ribs 152a can be flexed back by flexing the accessory flex clip 152 such that the accessory ribs 152a can glide along the rib ports 104a until the accessory ribs 152a are placed in the desired respective rib ports 104a.

The accessory rack 150 can also include an accessory sleeve 154 that connects at ends thereof to right and left sides of the accessory rack 150, while leaving an opening therebetween in which the accessory post 104 can be inserted through until the accessory ribs 152a engage within selected ones of the corresponding rib ports 104a. The accessory post 104 is preferably formed to be sufficiently rigid material to withstand forces applied against it and to securely hold the accessory rack 150 thereon. A stabilizer post 156 can also be provided to extend downward from a center portion of the accessory rack 150 to make contact with the seat 110 and provide additional support to the placement of the accessory rack 150.

The accessory rack 150 can also include accessory attachment screws 158 (or sets of nuts and bolts, or rivet style connectors) at opposite corners thereof to attach an accessory bag 160 thereto (described in more detail below with reference to FIGS. 5 and 6). Then such an accessory bag 160 can be easily attached to the accessory mounting frame 102 by slidingly inserting the sleeve 154 of the accessory rack 150 over the accessory post 104 to engage the accessory rack 150 with the accessory mounting frame 102.

FIG. 3 illustrates a side view of the accessory mounting frame 102 and the accessory rack 150. As illustrated, the accessory sleeve 154 extends outward from the accessory rack 150 so that the accessory post 104 can be inserted therethrough and be flexibly engaged at the rib ports 104a by the accessory ribs 152a. The securement strap(s) 114 can be fed through the respective securement strap port 109, wrapped around a side of a rail 402 of a one wheeled electric skateboard 400 (or other bar, frame, etc.), over the respective leg 112, around the seat 110 and then attach onto itself via the hook-and-loop system 114b, thus securing the accessory mounting frame 102 to the side rail 402 of a one wheeled electric skateboard 400.

FIG. 4A illustrates a view of the accessory mounting frame 102 being seated on, but before being secured to a side of a rail 402 of a one wheeled electric skateboard 400.

FIG. 4B illustrates a view of the accessory mounting frame 102 being seated on and secured to a side of a rail 402 of a one wheeled electric skateboard 400 with the securement straps 114, and the accessory rack 150 being slid onto the accessory flex clip 104 of the accessory mounting frame 102, which is fully secured to the side rail 402 of a one wheeled electric skateboard 400.

Figure 5:
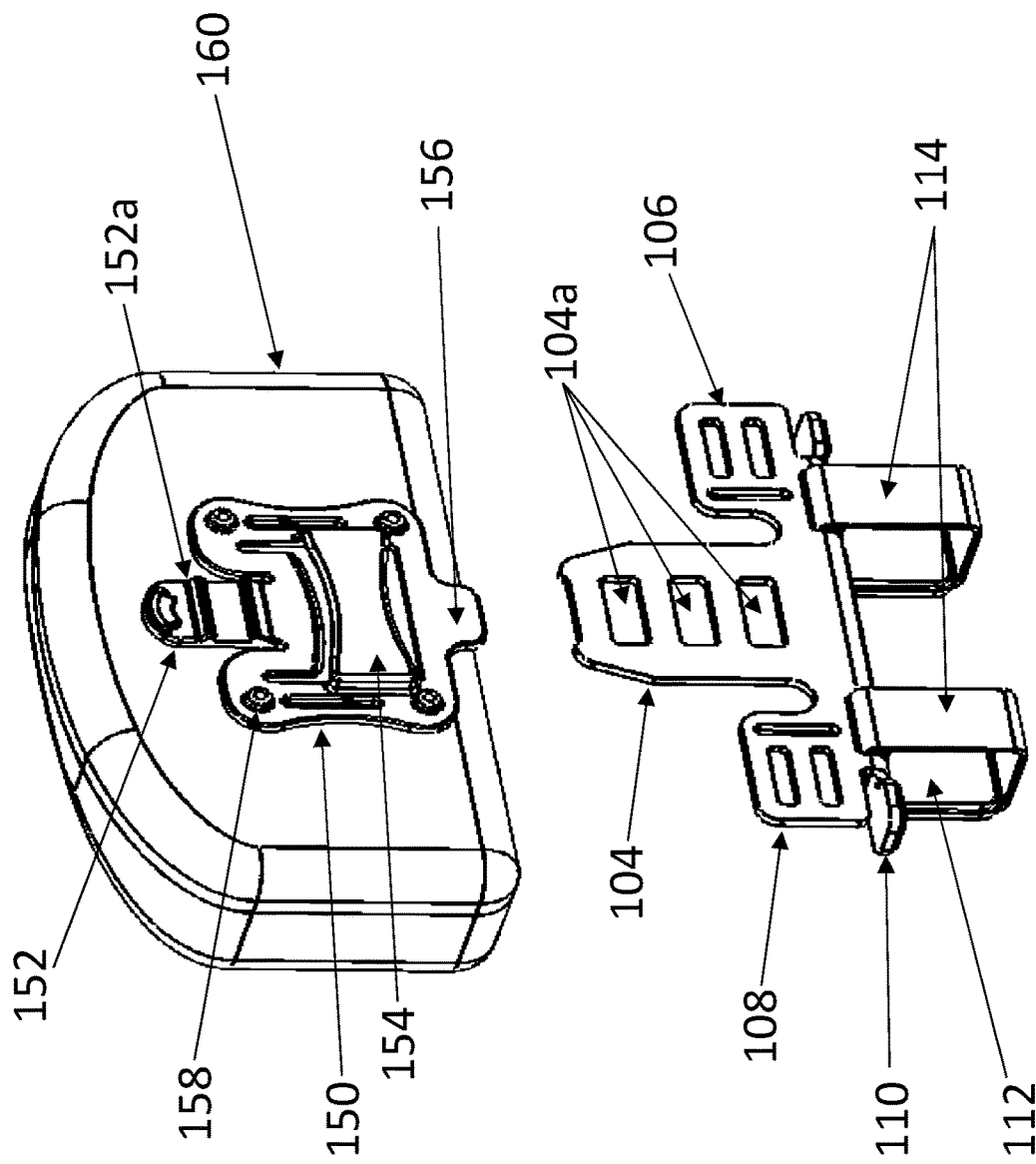
FIG. 5 illustrates a rear prospective view of an accessory mounting system in accordance with another example embodiment, configured to secure an accessory bag to a one-wheel electric skateboard or other one or two wheeled recreational/transportation vehicle.

FIG. 5 illustrates where an accessory bag 160 is attached to the accessory rack 150 via four sets of nuts and bolts 158. Alternatively, the accessory bag 160 could be attached to the accessory rack 150 via screws or other equivalent attachment means which will provide the desired results. The accessory bag 160 can be easily attached to the accessory mounting frame 102 by sliding the accessory sleeve 154 over the accessory post 104 and flexibly engaging the accessory ribs 152a into any two desired rib ports 104a.

FIG. 6 illustrates a side sectional view of the accessory bag 160 fully attached to the accessory rack 150, which in turn is fully engaged with the accessory mounting frame 102 via the accessory post 104. Here one of the accessory ribs 152a is disposed above the accessory post 104 and the second accessory rib 152a is disposed within the uppermost rib port 104a. Further, the securement strap(s) 114 is fed through the respective securement strap port 109, wrapped around a side rail 402 of a one wheeled electric skateboard 400, wrapped over the respective leg 112, fed through the respective D-ring 114a and secured to itself via the hook-and-loop attachment system 114b. Both the underside of the elongated seat 110 and an inner side of the at least one leg 112 can include a foam or rubber piece 110a and 112a attached thereto to provide shock absorption as well as protection from scratching the side rail 402.

Figure 7A:
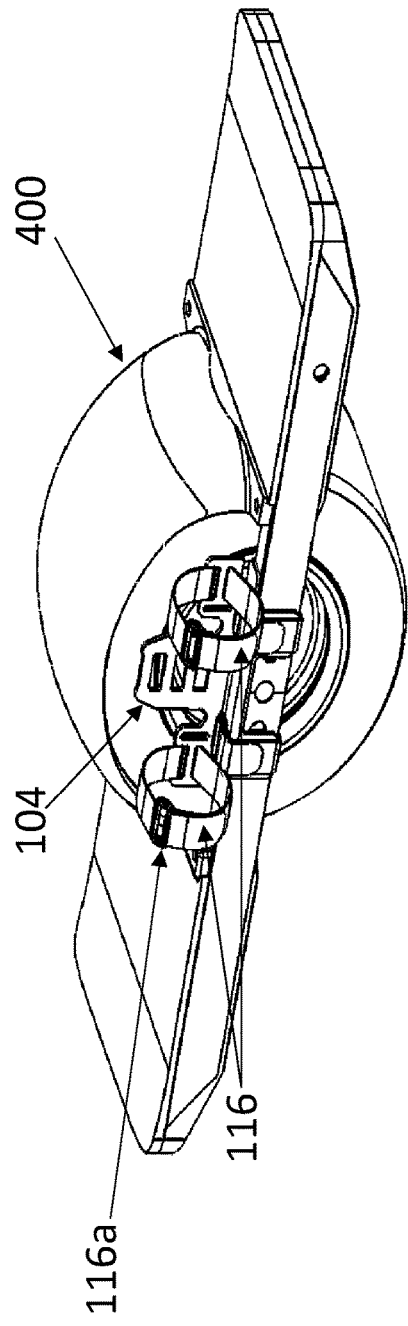
FIG. 7A illustrates a front prospective view of an accessory mounting system in accordance with another example embodiment, configured to secure a water bottle to a one-wheel electric skateboard or other one or two wheeled recreational/transportation vehicle.

FIG. 7A illustrates a front prospective view of an accessory mounting system 100 in accordance with another example embodiment, configured to secure a water bottle or other elongated accessory to a rail 402 of a one-wheel electric skateboard 400 (or other one, two, or even four wheeled recreational/transportation vehicle). Here each of the left attachment wing 106 and the right attachment wing 108 include accessory straps 116. The accessory straps 116 can be fed into one of the respective strap ports 106a, 108a (see FIGS. 1 and 2) and back out through the adjacent strap ports 106a, 108a to secure the accessory straps 116 to the accessory mounting frame 102. Each accessory strap 116 can include a D-ring 116a attached at a first end thereof and a hook-and-loop system (not illustrated) at a second end. The accessory straps 116 can secure a water bottle or other elongated accessories to the accessory mounting frame 102 by feeding the second end of the strap 116 including the hook-and-loop system through the D-ring 116a and then folding the strap 116 over itself to fasten the strap 116 closed with the hook-and-loop system. Other accessories/devices which can be secured to the accessory mounting frame 102 via the accessory straps 116 can include, for example a wireless speaker, fishing rod cases, flashlights, etc. It is to be noted that any accessory or device securable with the configuration of the accessory straps 116 can be secured to the accessory mounting frame 102 without departing from the spirit and scope of the present inventive concept.

Figure 7B:
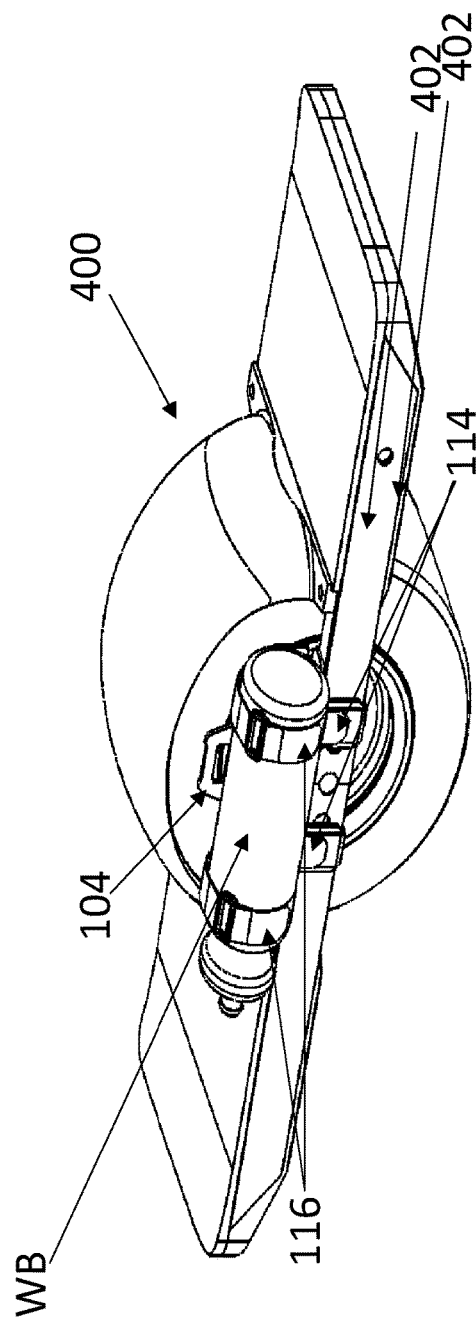
FIG. 7B illustrates a front prospective view of the accessory mounting system in accordance with the example embodiment of FIG. 7A, while securing a water bottle to a one-wheel electric skateboard.

FIG. 7B illustrates a front prospective view of the accessory mounting system 100 in accordance with the example embodiment of FIG. 7A, wherein a water bottle is secured to the rail 402 of the one-wheeled electric skateboard 400. As pointed out above, the accessory mounting frame 102 with a water bottle or other elongated accessory, secured thereto by the accessory straps 116, can be secured to any frame, bar or handle of a recreational/transportation vehicle by securing the accessory mounting frame 102 to a frame, bar or handle via the securement straps 114.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A removable accessory mounting system to mount accessories onto recreational vehicles, comprising:
    an accessory mounting frame including:
        an elongated seat;
        an accessory post extending perpendicularly away from a first side of the elongated seat, the accessory post including at least one rib port formed therein to securely receive a corresponding rib of an accessory rack therein;
        at least one leg extending perpendicularly away from a second side of the elongated seat in a direction opposite to accessory post; and
        a securement strap corresponding to each of the at least one leg to secure the elongated seat and at least one leg to a rail, bar or handle of a recreational vehicle; and
    an accessory rack including:
        a sleeve to receive the accessory post therethrough; and
        a flexible accessory clip having at least one accessory rib formed thereon to engage with the corresponding at least one rib port of the accessory post when the accessory port is inserted through the sleeve.

2. The removable accessory mounting system according to claim 1, further comprising:
    left and right attachment wings extending perpendicularly away from the first side of the elongated seat and to the left and right of the accessory post, respectively, wherein the left and right attachment wings each comprise at least two horizontal strap ports formed therein to receive accessory straps therethrough.

3. The removable accessory mounting system according to claim 2, further comprising:
    an accessory strap secured to each of the at least two horizontal strap ports of the left and right attachment wings, the accessory strap including a D-ring fastened to a first end thereof and a hook-and-loop system attached to a second end thereof, the accessory strap being configured to wrap around an elongated accessory, feed the second end through the D-ring and attach the hook-and-loop system together to secure an elongated accessory to the accessory mounting frame.

4. The removable accessory mounting system according to claim 2, wherein the at least one leg comprises two legs, a first leg being disposed below the left attachment wing and a second leg being disposed below the right attachment wing.

5. The removable accessory mounting system according to claim 2, wherein the left and right attachment wings each further comprise at least one vertical strap port formed vertically therein to receive a corresponding accessory strap therethrough.

6. The removable accessory mounting system according to claim 1, wherein the accessory mounting frame is formed of a metal, a hard plastic material or fiberglass material.

7. The removable accessory mounting system according to claim 1, further comprising:
    at least one fastening device to fasten an accessory bag to the accessory rack.

8. The removable accessory mounting system according to claim 7, wherein the accessory rack further comprises a first vertical accessory port disposed on a left side thereof and a second vertical accessory port disposed on a right side thereof, the first and second accessory ports being configured to receive an accessory strap therethrough to secure an accessory to the accessory rack.

9. The removable accessory mounting system according to claim 1, wherein the elongated seat and at least one leg are curved inward to form a single arc to rest securely on a circular frame or bar.

10. The removable accessory mounting system according to claim 1, wherein the at least one accessory rib includes two accessory ribs and the at least one rib port includes three rib ports from which the two accessory ribs can engage therewith.

11. The removable accessory mounting system according to claim 10, wherein the accessory rack further includes:
    at least one fastening device to fasten an accessory bag thereto.

12. The removable accessory mounting system according to claim 10, wherein the accessory mounting frame further includes left and right attachment wings extending perpendicularly away from a first side of the elongated seat.

13. A removable accessory mounting system to mount accessories onto recreational vehicles, comprising:
    an accessory mounting frame including:
        an elongated seat having an accessory post extending perpendicularly away from a first side thereof and including at least one rib port formed therein to securely receive a corresponding at least one rib formed on an accessory rack to attach the accessory rack to the accessory mounting frame, and at least one leg extending perpendicularly away from a second side of the elongated seat in a direction opposite to the accessory post; and a securement strap corresponding to each of the at least one leg to secure the elongated seat and at least one leg to a rail, bar or handle of a recreational vehicle; and an accessory rack including:
a sleeve to receive the accessory post therethrough; and
a flexible accessory clip having at least one accessory rib formed thereon to engage with a corresponding at least one rib port of the accessory post when the accessory post is inserted through the sleeve.

14. The removable accessory mounting system according to claim 13, further comprising:
left and right attachment wings extending in parallel with the accessory post, wherein the left and right attachment wings each comprise at least one horizontal strap port formed therein to receive accessory straps therethrough.

15. The removable accessory mounting system according to claim 14, further comprising:
an accessory strap secured to each of the at least one horizontal strap port of the left and right attachment wings, the accessory strap including a D-ring fastened to a first end thereof and a hook-and-loop system attached to a second end thereof, the accessory strap being configured to wrap around an elongated accessory, feed the second end through the D-ring and attach the hook-and-loop system together to secure an elongated accessory to the accessory mounting frame.

16. The removable accessory mounting system according to claim 15, wherein the left and right attachment wings each further comprise at least one vertical strap port formed vertically therein to receive a corresponding accessory strap therethrough.

17. The removable accessory mounting system according to claim 13, wherein the accessory rack further comprises a first vertical accessory port disposed on a left side thereof and a second vertical accessory port disposed on a right side thereof, the first and second accessory ports being configured to receive an accessory strap therethrough to secure an accessory to the accessory rack.

18. The removable accessory mounting system according to claim 13, wherein the at least one accessory rib includes two accessory ribs and the at least one rib port includes three rib ports from which the two accessory ribs can engage therewith.

19. A removable accessory mounting system to mount accessories onto recreational vehicles, comprising:
an accessory mounting frame including:
an elongated seat;
an accessory post extending perpendicularly away from a first side of the elongated seat, the accessory post including at least one rib port formed therein to securely receive a corresponding at least one rib of an accessory rack therein;
at least one leg extending perpendicularly away from a second side of the elongated seat in a direction opposite to the accessory post; and
a securement strap corresponding to each of the at least one leg to secure the elongated seat and at least one leg to a rail, bar or handle of a recreational vehicle; and
an accessory rack including:
a sleeve to receive the accessory post therethrough; and
a flexible accessory clip having at least one accessory rib formed thereon to engage with the corresponding at least one rib port of the accessory post when the accessory post is inserted through the sleeve.

20. The removable accessory mounting system according to claim 19, further comprising:
a vertically disposed accessory strap port at both sides of the accessory post; and
an accessory strap fed through the vertical accessory strap ports to secure accessories against the accessory post and the elongated seat.

21. The removable accessory mounting system according to claim 19, further comprising:
at least one fastening device to fasten an accessory bag to the accessory rack.

22. The removable accessory mounting system according to claim 19, wherein the at least one accessory rib includes two accessory ribs and the at least one rib port includes three rib ports from which the two accessory ribs can engage therewith.

23. The removable accessory mounting system according to claim 22, wherein the accessory rack further includes:
at least one fastening device to fasten an accessory bag thereto.

* * * * *